United States Patent
Leong et al.

(10) Patent No.: US 7,434,156 B1
(45) Date of Patent: Oct. 7, 2008

(54) METHOD, SYSTEM, PROGRAM, AND COMPUTER READABLE MEDIUM FOR PROVIDING A DATABASE FOR OBJECT ORIENTED OBJECTS

(75) Inventors: Terence Leong, Benicia, CA (US); Mahima Mallikarjuna, Fremont, CA (US); Julian Taylor, Nederland, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 804 days.

(21) Appl. No.: 09/722,923

(22) Filed: Nov. 27, 2000

(51) Int. Cl.
*G06F 17/00* (2006.01)

(52) U.S. Cl. .................. 715/234; 715/248; 715/242; 717/108; 717/164; 717/114

(58) Field of Classification Search ............. 715/524, 715/523, 522, 513, 516, 514, 234, 248, 242; 717/108, 164, 114; 707/103 Y, 103 Z, 104.1
See application file for complete search history.

(56) References Cited

U.S. PATENT DOCUMENTS

| | | | | |
|---|---|---|---|---|
| 6,085,196 | A * | 7/2000 | Motoyama et al. | 707/102 |
| 6,128,771 | A | 10/2000 | Tock et al. | |
| 6,569,207 | B1 * | 5/2003 | Sundaresan | 715/513 |
| 6,678,867 | B2 * | 1/2004 | Fong et al. | 715/523 |
| 7,096,419 | B2 * | 8/2006 | Barnes et al. | 715/234 |
| 2003/0088708 | A1 * | 5/2003 | Lewallen | 709/315 |
| 2003/0093770 | A1 * | 5/2003 | Fernandez | 717/118 |
| 2003/0121000 | A1 * | 6/2003 | Cooper et al. | 715/513 |
| 2003/0229529 | A1 * | 12/2003 | Mui et al. | 705/8 |
| 2004/0162841 | A1 * | 8/2004 | Bernstein et al. | 707/100 |

OTHER PUBLICATIONS

G.M. Bierman, 'Using XML as an Object Interchange Format', Department of Computer Science, University of Warwick, May 17, 2000, pp. 1-13.*

G.M. Bierman 'Using XML as an Object Interchange Format', Dept. of Comp. Science Univ. of Warwick, May 17, 2000. pp. 1-13.*

Stevens, Al. "Object-Oriented Database Management Systems, Examining a trio of OODBMS tools" [online], 1993, *Dr. Dobb's Journal*, pp. 1-22. [Retrieved on Nov. 16, 2000] Retrieved from the Internet.

Bierman, GM. "Using XML as an Object Interchange Format", May 17, 2000, Univ. of Warwick, pp. 1-13.

(Continued)

*Primary Examiner*—Stephen Hong
*Assistant Examiner*—Matthew J Ludwig
(74) *Attorney, Agent, or Firm*—Dorsey & Whitney LLP (57) ABSTRACT

Provided is a method, system, program, and computer readable medium for maintaining a database of objects. At least one structured document is received representing an instance of an object including attributes and attribute values defined for a class. Content of the structured document representing the object is added into the database, wherein the database is capable of storing multiple structured documents representing multiple objects. In another implementation, an instance of at least one object including attributes and attribute values defined for a class is generated. For each generated object, a structured document is generated representing the object and including a representation of the attributes and attribute values in the object. Each structured document is transferred to the database to maintain.

42 Claims, 7 Drawing Sheets

OTHER PUBLICATIONS

Kim, Won. "Research Directions in Object-Oriented Database Systems", 1990, ACM 089791-352-3/90/0004/0001, Austin, Texas, pp. 1-15.

Bancilhon, Francois. "Object-Oriented Database Systems", 1988, ACM 0-89791-63-2/88/0003/0152, France, pp. 152-162.

Smith, Karen E. et al. "Intermedia: A Case Study of the Differences Between Relational and Object-Oriented Database Systems", Oct. 4-8, 1987, ACM 0-89791-247-0/87/0010-0452, Providence, Rhode Island, pp. 452-465.

Li, Qing et al. "Object Flavor Evolution in an Object-Oriented Database System", 1988, ACM 0-89791-261-6/88/0003/0265, Los Angeles, California, pp. 265-275.

Pantziarka, Panagiotis. "Objected Oriented Database Using Frames In Second Generation APL", 1990, ACM 089791-371-X/90/0008/0284, London, pp. 284-287.

Baroody, Jr., A. James et al. "An Object-Oriented Approach to Database System Implementation", Dec. 1981, ACM Transactions on Database Systems, vol. 6, No. 4, pp. 576-601.

Boll, Susanne, et al. "A Java Application Programming Interface to a Multimedia Enhanced Objected-Oriented DBMS" German National Research Center for Information Technology, Germany, pp. 1-11. [Retrieved on Nov. 17, 2000].

* cited by examiner

METHOD, SYSTEM, PROGRAM, AND COMPUTER READABLE MEDIUM FOR PROVIDING A DATABASE FOR OBJECT ORIENTED OBJECTS

BACKGROUND OF THE INVENTION

1. Field of the Invention

The present invention relates to a method, system, program, and computer readable medium for providing a database of object oriented objects.

2. Description of the Related Art

An object oriented data base system (OODBMS) provides a persistent and sharable repository and manager of objects defined according to an object-oriented data model. Every object encapsulates a state and behavior. The state of an object comprises the values of the attributes (also referred to as properties) defined for the object, and the behavior of the object comprises the methods provided with the objects. Objects that share the same attributes and methods comprise a class. All the objects maintained in an OODBMS are members of the same class or have the same parent class. This means that the same set of methods defined for the class are used to manipulate the objects in the OODBMS, such as create, delete, add, read, modify, update, etc. Further the objects in a class have the same attributes defined for the class, even though particular attributes within any of the objects in the class may have different values. Objects persistently stored within an OODBMS defined for a class are viewed and distinguished according to the values provided for their attributes. Each object is further provided a unique identifier for use in accessing the object within the OODBMS using the interfaces provided for the class. Benefits and further explanations of object oriented databases are described in "Research Directions in Objected-Oriented Database Systems", by Won Kim (Copyright Association of Computing Machinery, 1990); "Intermedia: A Case Study of the Differences Between Relational and Object-Oriented Database Systems", by Karen E. Smith, Stanley B. Zdonik, OOPSLA '87 Proceedings (Copyright Association of Computing Machinery, 1987); and U.S. Pat. No. 6,128,771, all of which publications and patents are incorporated herein by reference in their entirety.

Currently, many object oriented database systems are implemented using a Java application programming interface (API).** The application programmer may write APIs in Java to use to access the object oriented database management system (OODBMS). The interfaces to the objects in the OODBMS are also written in Java, and the objects in the OODBMS are implemented as Java classes. In such Java implemented OODBMS, Java applications can generate Java objects to add to the Java OODBMS and utilize Java APIs to manipulate the Java objects in the Java OODBMS.

** JAVA is a trademark of Sun Microsystems, Inc.

One challenge with prior art object oriented database systems is that applications written in different programming languages cannot share objects in the same OODBMS. For instance, a C or C++ application program creating a C or C++ data object cannot add objects to a Java OODBMS because of differences in the naming conventions and structures in the different programming languages. Thus, although two applications written in different languages may utilize the same class of objects having the same attributes and attribute values, and desire to share the same data objects, the applications in the different programming languages cannot store and access objects in the same OODBMS. Due to such limitations, duplicate object oriented databases must be provided for the application programs in the different programming languages even though such application programs intend to use the same data objects instantiated from the same class. Further, one application will not be able to access or manipulate the objects created by the other application and maintained in that applications OODBMS.

For these reasons, there is a need in the art to provide mechanisms to allow application programs in different programming languages to utilize the same OODBMS.

SUMMARY OF THE DESCRIBED IMPLEMENTATIONS

Provided is a method, system, program, and data structures for maintaining a database of objects. At least one structured document is received representing an instance of an object including attributes and attribute values defined for a class. Content of the structured document representing the object is added into the database, wherein the database is capable of storing multiple structured documents representing multiple objects.

In another implementation, an instance of at least one object including attributes and attribute values defined for the class is generated. For each generated object, a structured document is generated representing the object and including a representation of the attributes and attribute values in the object. Each structured document is transferred to the database to maintain.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
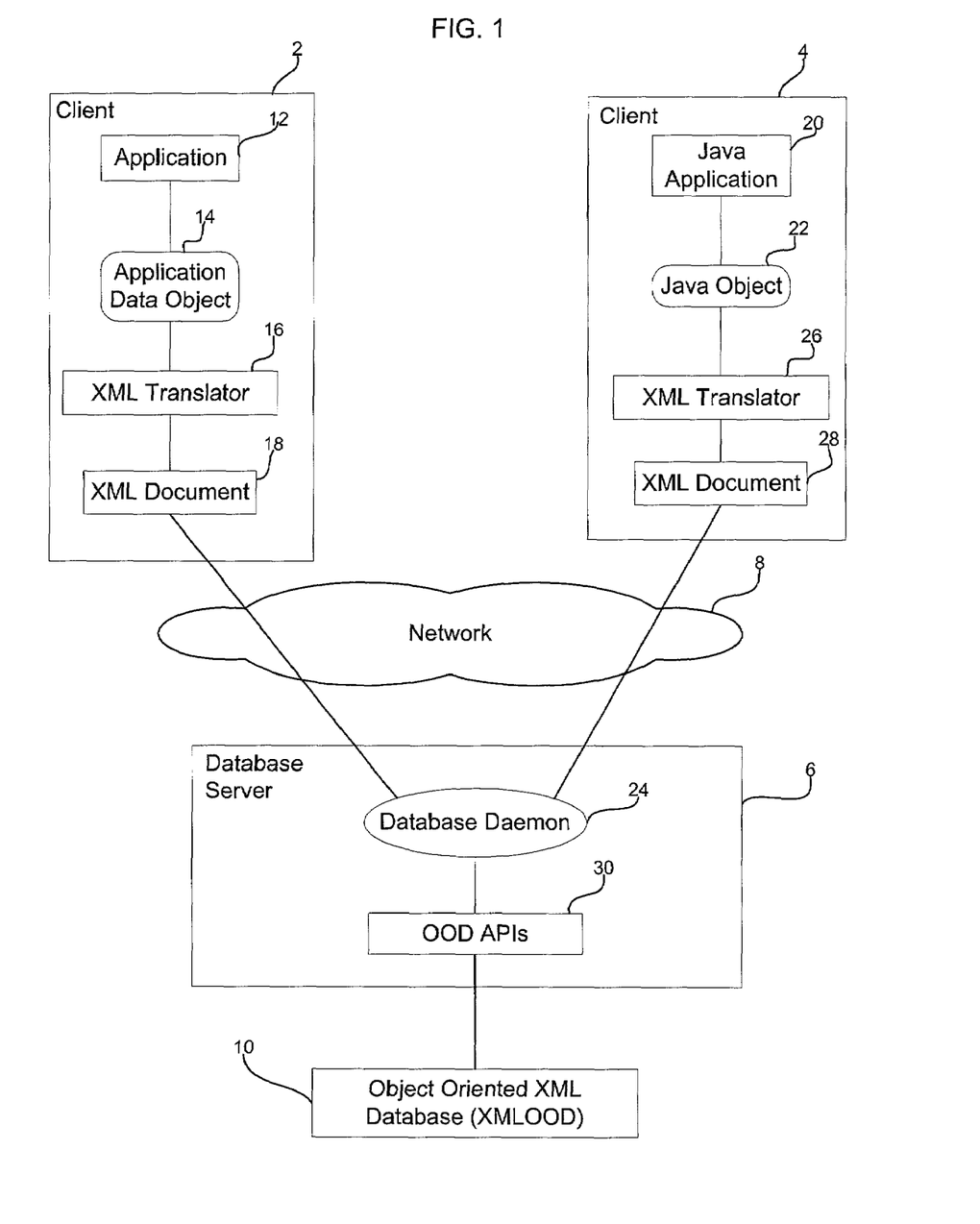
FIG. 1 illustrates a computing environment defining one possible implementation of the invention.

FIG. 1 illustrates a computing environment in which certain described implementations operate. Two client systems 2 and 4 communicate with a database server 6 over a network 8 using a communication protocol, such as the Transfer Control Protocol/Internet Protocol (TCP/IP), or other communication protocol known in the art. The database server 6 manages access to an object oriented Extended Markup Language (XML) database (XMLOOD) 10. The XMLOOD 10 is maintained in a storage device accessible through the database server 6. All objects in the object oriented XML database (XMLOOD) 10 are members of a same parent class. The client systems 2 and 4 and database server 6 may comprise any microprocessor computing system capable of providing a platform to execute the programs and instructions described herein, such as a personal computer, laptop computer, server, mainframe, workstation, hand held computer, telephony device, etc. The network 8 may comprise any network connection known in the art, such as a local area network (LAN), Intranet, the Internet, Wide Area Network (WAN), etc., or a wireless connection.

Client system 2 includes an application program 12, which for purposes of description, is implemented in a structured or object oriented programming language other than Java, e.g., C, C++, Smalltalk, Fortran, etc. The application program 12 is capable of producing application data objects 14 that conform to a particular class structure implemented in the application program 8, and are non-Java objects. An extensible markup language (XML) translator 16 is capable of transforming the content of the data object 14 into a structured XML file 18.

The client system 4 includes an executing Java application 20 executing in the client system 4 that is capable of producing Java objects 22 in manner known in the art. An XML translator 24 transforms the content of the Java object 22 into a structured XML document 26. The client system 4 would further include a Java Virtual Machine (JVM) to convert Java bytecodes to instructions in the native machine language of the client 4. The client systems 2 and 4 are capable of transmitting a data stream to the database server 6 over the network 8 including the XML document 18, 28, and other protocol information.

The database server 6 includes a database daemon 24 that monitors a port on the database server 6 for requests from clients 2 and 4 to access the object oriented database 10. Object oriented database application interfaces (OOD APIs) 30 comprise instructions to manipulate the data in the XMLOOD 10. The OOD APIs 30 would comprise instructions to parse and perform operations within the XMLOOD 10, such as instructions to add data, delete data, access and read data, update data, etc. Such OOD APIs 30 may include typical commands to parse and process an XML file, such as the type of commands found in the Simple API for XML (SAX) parser. Alternatively, the XML files can be generated into a Document Object Model (DOM) tree in a manner known in the art and then manipulated using DOM commands. The OOD APIs 30 are specifically designed to handle and process XML objects stored in the XMLOOD 10. The database daemon 24 invokes the OOD APIs 30 to perform the client requested manipulation of the XMLOOD 10. In implementations where the OOD APIs 30 comprise Java commands or the database daemon 24 is implemented as a Java program, then the database server 6 would include a Java Virtual Machine (JVM) to convert Java bytecodes to instructions in the native machine language of the database server 6.

The XML translators 16 and 26 are capable of parsing a data object in a structured or object oriented programming language and converting the attributes of the object to tagged elements in an XML file. Each attribute and attribute value in the data object would map to a separate tagged attribute element and tagged attribute value in the XML document representing the object. Such conversions of objects to XML documents are known in the art and described in the publication "Using XML as an Object Interchange Format" by G. M. Bierman (May 17, 2000), available on the Internet at "http://www.odmg.org/library/readingroom/oifm1.pdf", which publication is incorporated herein by reference in its entirety.

For instance, a class PERSON may be defined with attributes NAME and AGE as follows:
  interface Person {
    attribute string Name;
    attribute unsigned short Age;
  };

An object instance of the class PERSON may have the name "Sally" and an age of eleven. Below is an example of how the instance of the object "Sally" of the class person may map to a tagged XML file including tagged attribute elements and tagged attribute values.

```
<object oid="Sally">
    <class>Person</class>
    <contents>
        <attribute name="Name">
            <value><string val="Sally"/></value>
        </attribute>
        <attribute name="Age">
            <value><unsignedshort val="11"/></value>
        </attribute>
    </contents>
</object>
```

Moreover, when generating the XML document from an object oriented object, the XML translator 16 and 26 would further generate a document type definition (DTD) into the XML document defining the hierarchical organization of attributes, values, and other elements in the XML document. The XML translators 16 and 26 may receive a schema indicating the class structure of the data object, including all attributes and attribute values for the class. The XML translators 16 and 26 would then be able to generate an XML shell file based on the layout of attributes and values in the class schema. The XML shell file could include the root tag as well as all the class tags, attribute tags, and value tags with no provided values. The XML translators 16 and 26 would then process the objects 14 and 22, respectively, to populate the tagged value fields with the attribute values provided in the objects 14 and 22.

Figure 2:
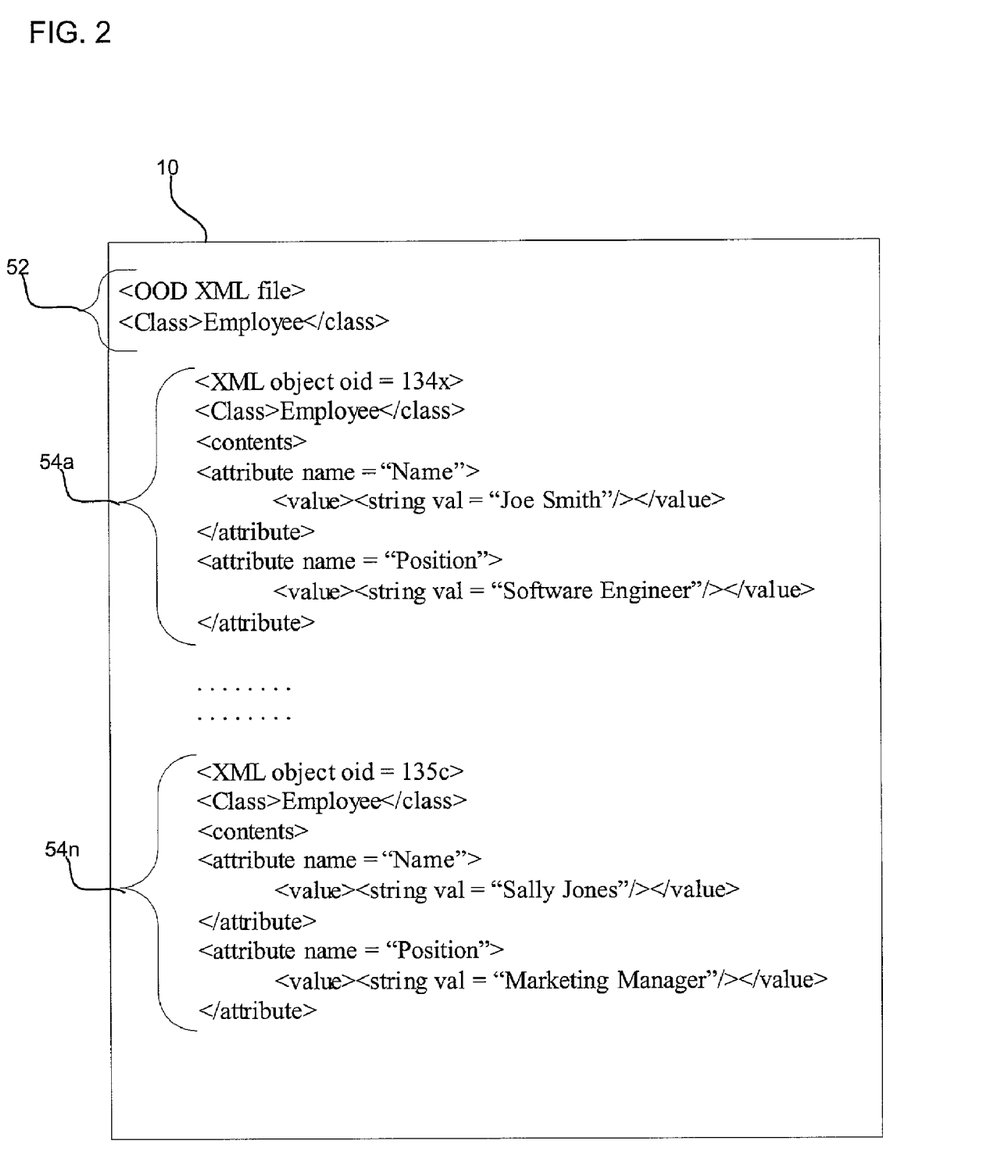
FIG. 2 illustrates an example of a database of objects implemented in an XML file in accordance with certain described implementations of the invention.

In one implementation, the object oriented XML database 10 is formed in an XML file 10 as shown in FIG. 2, including a root tag 52 and a plurality of XML objects 54*a*, . . . *n*. Each object is the member of an EMPLOYEE class, having as attributes a NAME of the employee as well as a POSITION attribute. Object 54*a* is an instance of the class EMPLOYEE, having a NAME value of "Joe Smith" and a "POSITION" value of "Software Engineer". Other objects would include instances of other employees, including the employee name and job position. Each XML object includes the content of an XML document that was generated by the XML translators 16, 26 representing an object in a structured or object oriented language. The OOD APIs 30 are capable of parsing the object oriented XML database (XMLOOD) 10 file to access and perform operations with respect to the XML objects 54*a*, . . . , *n*.

Figure 3:
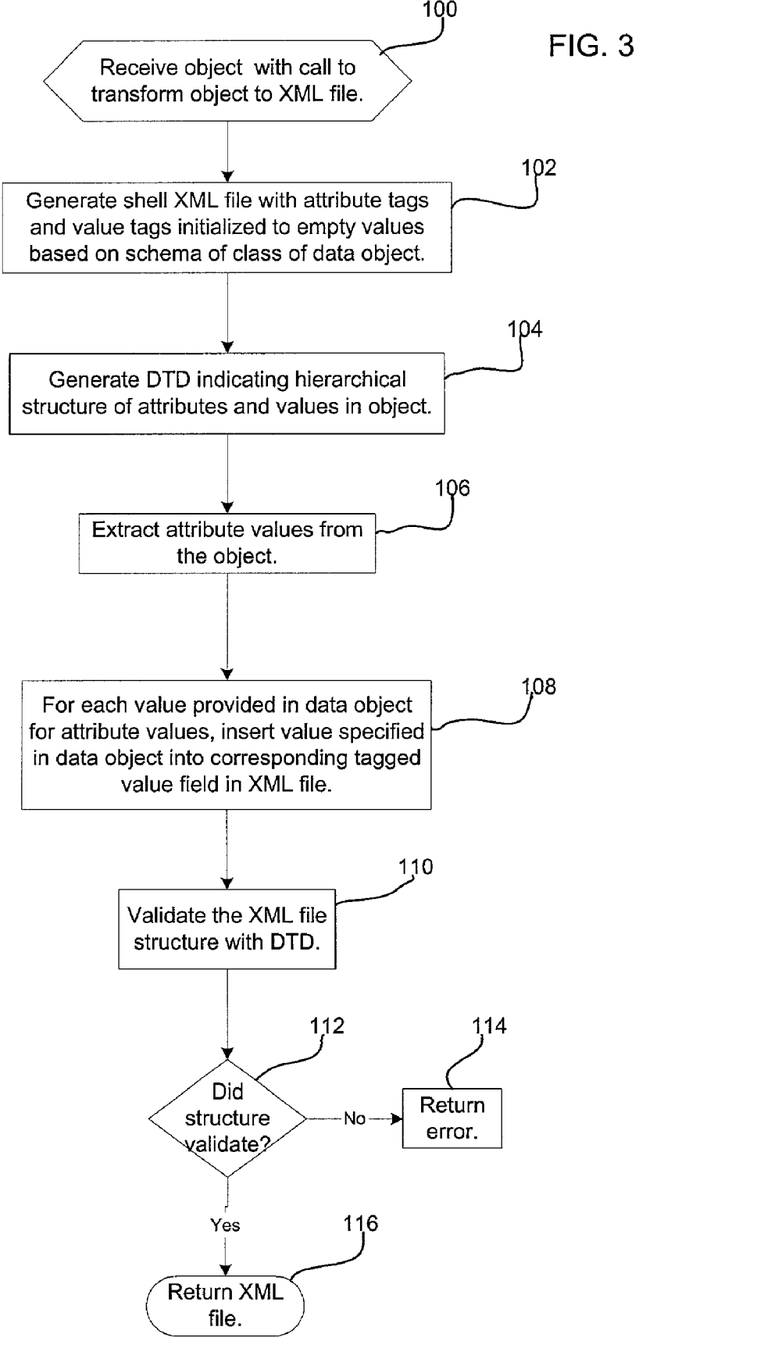
FIG. 3 illustrates logic to transform an object to an XML document in accordance with certain described implementations of the invention.

FIG. 3 illustrates logic implemented in the XML translators 16 and 26 to transform an object in a structured or object oriented language into an XML document 18, 28. Control begins at block 100 with the XML translator 16, 26 receiving a call to transform an object to an XML document. In response, the XML translators 16, 26 generate (at block 102) a shell XML document with attribute tags and value tags initialized to empty values based on a schema of the class of which the object is an instance. The schema provides a representation of the attributes of a class and their values. The XML translators 16, 26 further generate (at block 104) a document type definition (DTD) that defines how the markup tags should be interpreted by the application presenting the document. The XML translators 16, 26 then extract (at block 106) the values for the attributes from the received object. For each attribute value provided in the object, the XML translator 16, 26 inserts (at block 108) the value into the corresponding tagged value field in the XML document 18, 28. The generated XML document 18, 28 is then validated (at block 110) against the generated document type definition (DTD) in a manner known in the art. If (at block 112) the XML file does not validate, then an error is returned (at block 114). Otherwise, the valid XML file is returned (at block 116).

The logic of FIG. 3 may be invoked by an API called by the application 12 to add an object to the object oriented XML database (XMLOOD) 10. The clients 2 and 4 would be provided with client OOD APIs that the applications 12, 20 may call to perform operations with respect to the object oriented XML database (XMLOOD) 10. Such client OOD APIs would generate a stream of data and commands to the database daemon 24 that instruct the database daemon 24 to perform a requested operation against the XMLOOD 10.

Figure 4:
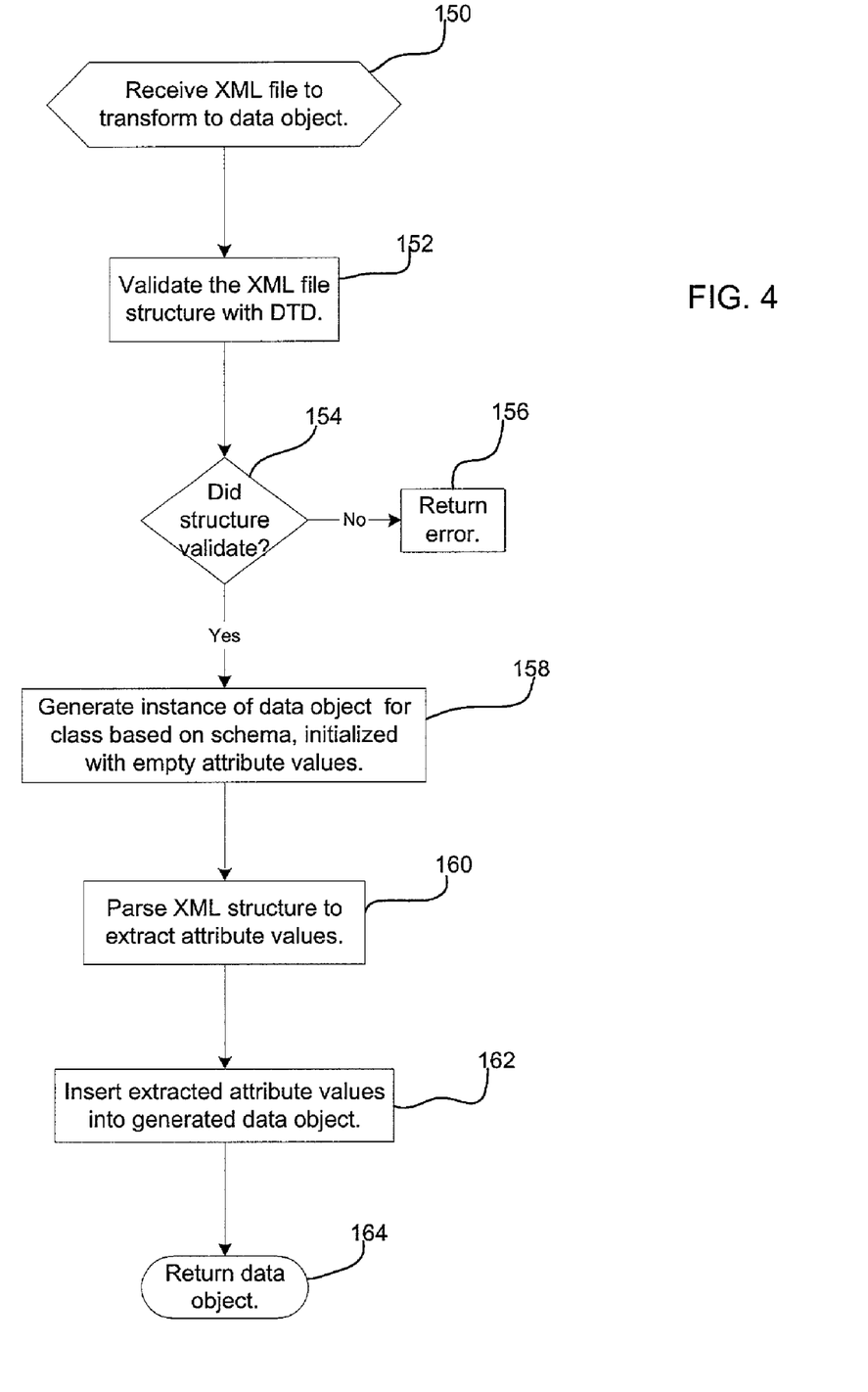
FIG. 4 illustrates logic to transform an XML document representing an object to an object in accordance with certain described implementations of the invention.

FIG. 4 illustrates logic executed in the XML translators 16, 26 to transform an XML document 18, 28 representing an object from the object oriented XML database (XMLOOD) 10 to an object in the structured (e.g., C, FORTRAN, Pascal, etc.) or object oriented programming (e.g., Java, C++, Smalltalk, etc.) language of the applications 12, 20. The logic of FIG. 4 would be invoked by a client OOD API that receives (at block 150) an XML document from the database daemon 24 and calls the XML translator 16, 26 to transform the XML document to an object in the structured or object oriented language of the application 12, 20 to return to the application to use. The XML translator 16, 26 validates (at block 152) the received XML document with the document type definition (DTD) included in the XML document. If (at block 154) the XML document does not validate, then an error is returned (at block 156). Otherwise, if the XML document is valid, then the XML translator 16, 26 generates (at block 158) an instance of the data object for the class based on the class schema initialized with empty attribute values. The XML translator 16, 26 parses the XML document and extracts (at block 160) attribute values and inserts (at block 162) the extracted values into the generated data object. The data object is returned (at block 164) to the application 12, 20.

Figure 5:
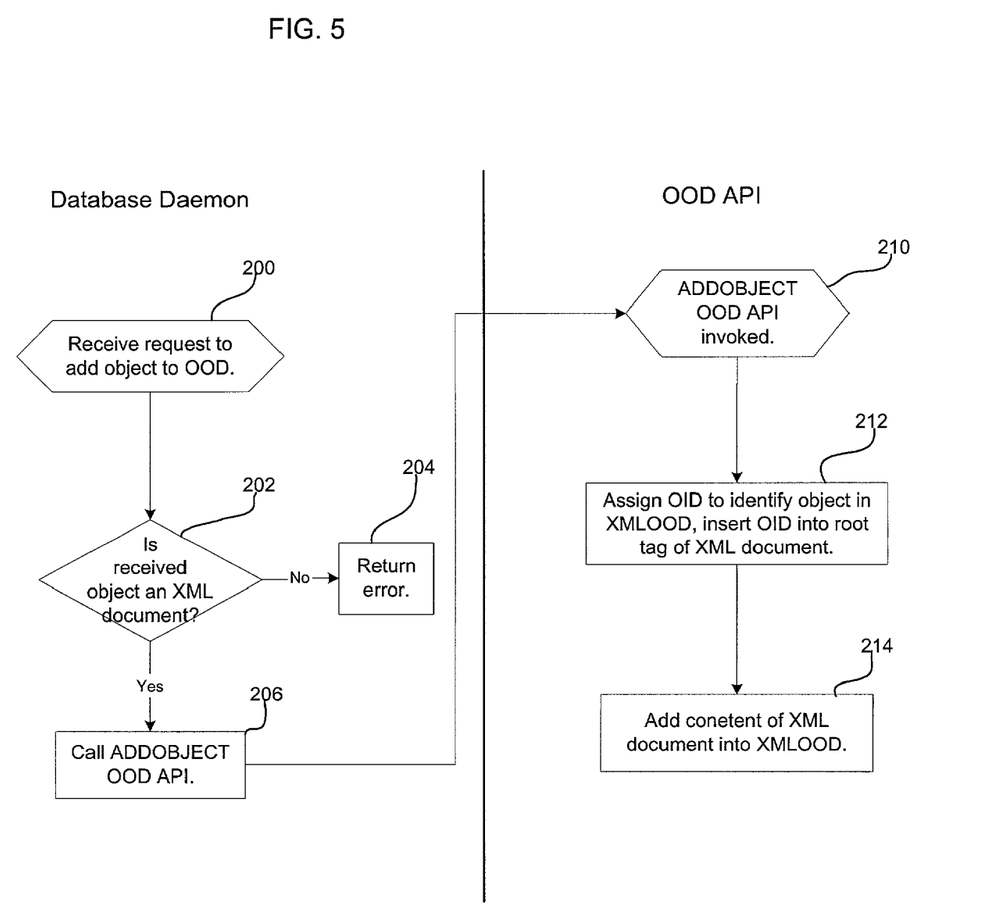
FIG. 5 illustrates logic to add an XML document representing an object to a database in accordance with certain described implementations of the invention.

FIG. 5 illustrates logic implemented in the database daemon 24 and an ADDOBJECT API that is part of the OOD APIs 30 to add the content of an XML document 18, 28 representing an object 14, 22 to the object oriented XML database 10. At block 200, the database daemon 24 receives an object to add to the XMLOOD 10. If (at block 202) the received object is not an XML document, then an error is returned (at block 204). Otherwise, the database daemon 24 calls the ADDOBJECT API. In response to the call of the ADDOBJECT API (at block 210), an object identifier (OID) is assigned (at block 212) to uniquely identify the object in the XMLOOD 10. The content of the XML document, including the attribute and attribute value information, is then added (at block 214) to the object oriented XML database 10.

Figure 6:
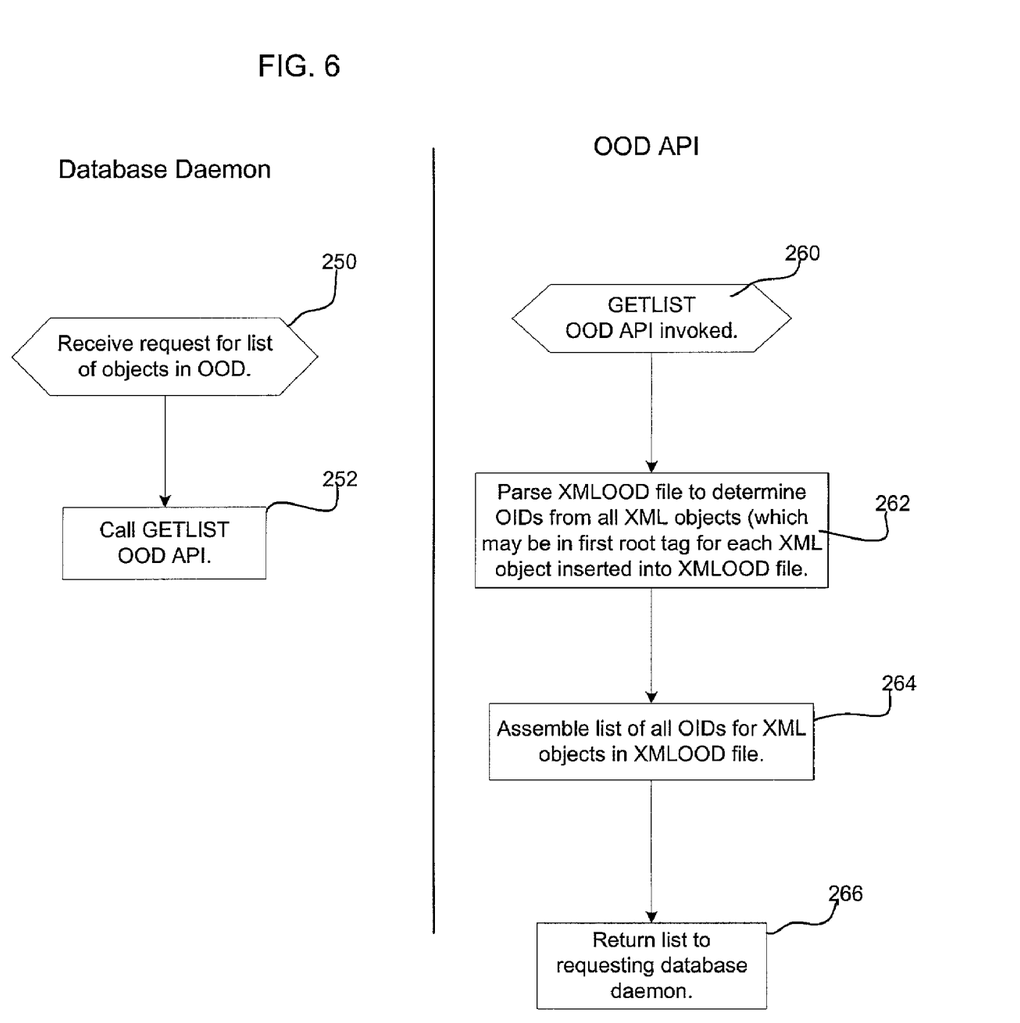
FIG. 6 illustrates logic to generate a list of object identifiers (OID) of objects in the database in accordance with certain described implementations of the invention.

FIG. 6 illustrates logic implemented in the database daemon 24 and a GETLIST API that is part of the OOD APIs 30 to generate a list of object identifiers (OIDs) in response (at block 250) to a GETLIST request from one of the applications 12, 20. In response to the GETLIST request, the database daemon 24 calls (at block 252) GETLIST OOD API. The GETLIST API parses (at block 262) the XMLOOD 10 to determine the OIDs from all the XML objects 54a, ..., n and assemble (at block 264) a list of all the OIDs. The GETLIST OOD API would return (at block 256) the list to the database daemon 24, which in turn would return the list to the client 2, 4 applications 12, 20.

Figure 7:
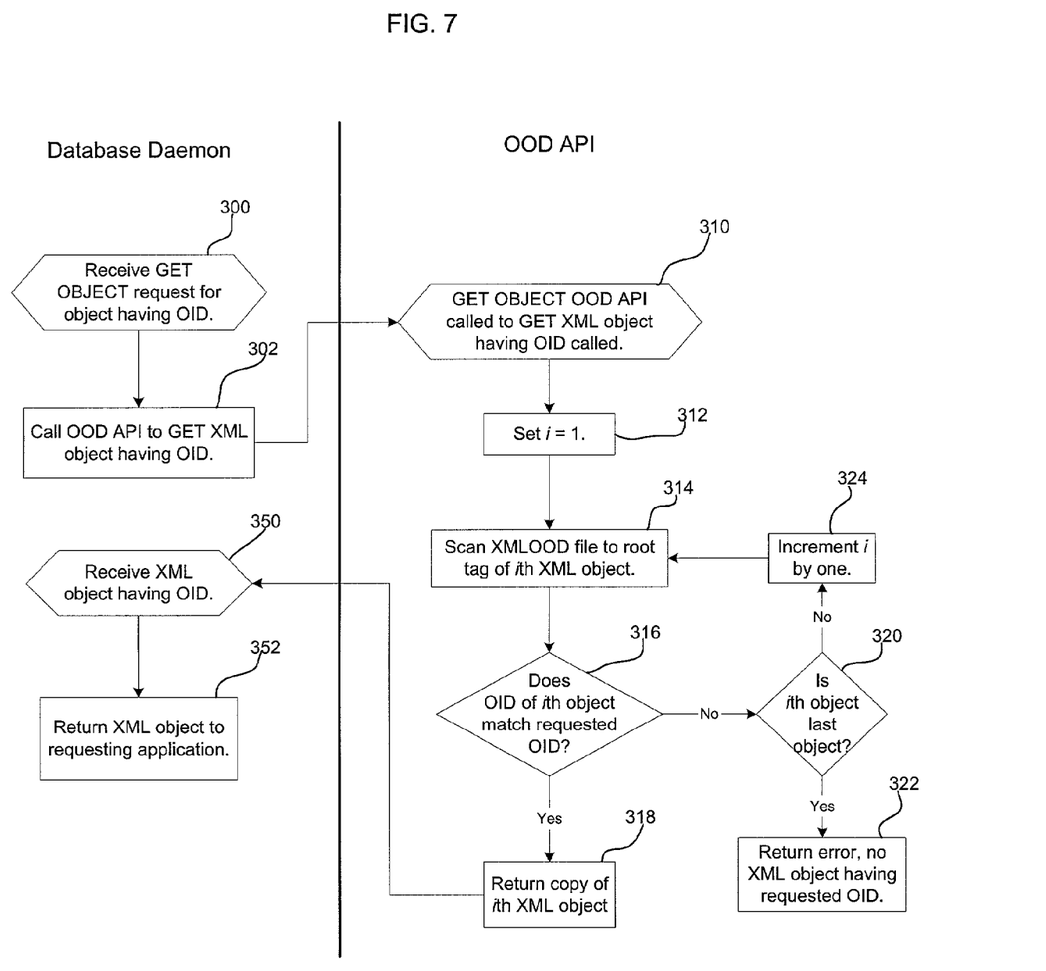
FIG. 7 illustrates logic to access an object in the database in accordance with certain described implementations of the invention.

FIG. 7 illustrates logic implemented in the database daemon 24 and a GETOBJECT API that is part of the OOD API 30 set to retrieve an object having the specified OID. At block 300, the database daemon 24 receives a GETOBJECT request from one of the applications 12, 20, which is a member of the client OOD APIs. In response, the database daemon 24 calls (at block 302) a GETOBJECT API from the OOD APIs 30 to retrieve the object having the requested OID.

Blocks 310 to 322 illustrate logic implemented in the GETOBJECT API. At block 310, the GETOBJECT API is called. In response, a variable i is set (at block 312) to one. The object oriented XML database (XMLOOD) 10 is scanned for the root tag of the ith XML object. If (at block 316) the requested OID matches the OID of the ith XML object, then a copy of the ith XML object is returned (at block 318) to the database daemon 24. Otherwise, if the OIDs do not match and if (at block 320) the ith XML object is the last object, then an error is returned (at block 322) indicating that no XML object in the database 10 has the requested OID. If the ith object is not the last object, then i is incremented (at block 324) and control returns to block 314 to determine if the next object has a matching OID. In response (at block 350) to receiving a matching XML object 54a, ..., n, the database daemon 24 returns the XML object to the requesting application 10, 20.

In the above descriptions, the objects and database of objects are implemented in an XML document. The client applications are provided with an XML translator to translate objects in a structured or object oriented programming language to an XML document and translate XML documents into objects. This allows the representation of objects generated for different structured and/or object oriented programming languages to be stored and manipulated in a same object database. In this way, different applications in different programming languages may share the same object oriented database and data objects therein.

What follows are some alternative implementations.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the discussed implementations, one client application comprised a Java application and the other a non-Java application. However, the different client applications may both be implemented in different non-Java object oriented programming languages, or implemented in structured programming languages.

In discussed implementations, the object oriented XML database included only objects that were instances of the same class. In further implementations, objects from multiple classes may be maintained in the object oriented XML database.

In discussed implementations, the XML translators 16, 26 were maintained in the client systems 2, 4. In alternative implementations, the clients 2, 4 may not maintain the XML translator 16, 26. Instead, the database daemon 24 may maintain XML translators to translate objects in different structured or object oriented programming languages into an XML document, and to translate XML objects to objects in the structured or object oriented programming language of the requesting client application.

In discussed implementations, an XML document format was used to transport and store the objects in the persistent object oriented database. In alternative implementations, a different file format, such as a different structured file format, may be used to represent the attributes and values of the object instance of the class, such as a different standard generalized markup language (SGML), hypertext markup language (HTML), extensible hypertext markup language (xHTML), etc. In this way, the attribute of an object may be represented in alternative structured document formats.

In discussed implementations, the object oriented database comprises an XML document. In alternative implementations, the content of the XML objects, or other structured document objects, may be stored in data structures other than an XML document, such as a database of objects or files, an index of files, an object oriented database, etc. Further, the structured document formats used to represent the objects and implement the database may comprise different file formats.

In discussed implementations, the client applications are included in client systems that communicate with the database server over a network. In alternative implementations, the applications and XML translators may be implemented on the same computing platform including the database daemon.

The foregoing description of various implementation of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method for maintaining a database of objects accessible by applications written in a plurality of programming languages comprising:

receiving an instance of a first object to store in a database, wherein the first object is implemented in a first programming language;

receiving an instance of a second object to store in the database, wherein the second object is implemented in a second programming language;

generating at least a first structured document representing the instance of the first object and including a representation of the attributes and attribute values in the first object;

generating at least a second structured document representing the instance of the second object and including a representation of the attributes and attribute values in the second object;

adding content of the first structured document representing the first object into the database;

adding content of the second structured document representing the second object into the database;

providing access to the database of objects such that application programs implemented in the first and second programming languages are capable of sharing objects, in their respective programming language, represented as structured documents in the database; and wherein the database comprises a structured document, and wherein adding the content of each structured document representing one object comprises inserting the content of the structured document representing the object into the structured document implementing the database.

2. The method of claim 1, further comprising:

receiving multiple structured documents representing instances of objects defined for a class, wherein the objects represented in at least two different received structured documents were generated in different programming languages.

3. The method of claim 1, wherein the database structured document and the structured documents representing the objects are in a same file format.

4. The method of claim 3, wherein the same file format comprises an extensible markup language (XML) document format.

5. The method of claim 1, wherein each of the first and second structured documents comprises an extensible markup language (XML) document.

6. The method of claim 1, wherein the first and second objects are instantiated from a same class.

7. A computer implemented method for accessing a database of objects originally instantiated in at least two different programming languages, comprising:

generating an instance of a first object including attributes and attribute values defined for a class in a first programming language;

generating an instance of a second object including attributes and attribute values defined for the class in a second programming language;

generating a first structured document representing the first object and a second structured document representing the second object;

transferring each structured document to the database to maintain;

providing access to the database of objects such that application programs implemented in the first and second programming languages are capable of sharing objects, in their respective programming language, represented as structured documents in the database; and wherein the database comprises a structured document, and wherein transferring each structured document into the database to maintain comprises inserting the content of the first and second structured documents into the structured document implementing the database.

8. The method of claim 7, further comprising:
receiving the first structured document from the database representing attributes and attribute values for the first object originally instantiated in a first programming language; and
generating a third object in the first, second, or a third programming language that includes the attributes and attribute values represented in the first structured document, wherein the generated object embodies the first object represented by the received first structured document.

9. The method of claim 8, wherein the database structured document and the first and second structured documents are in a same file format.

10. The method of claim 9, wherein the same file format comprises an extensible markup language (XML) document format.

11. The method of claim 7, wherein each of the first and second structured documents comprises an extensible markup language (XML) document.

12. The method of claim 7, wherein the first and second objects are instantiated from a same class.

13. A system for maintaining a database of objects, comprising:
means for receiving an instance of a first object and an instance of a second object to store in a database, wherein the first object is implemented in a first programming language and the second object is implemented in a second programming language;
means for generating a first structured document and a second structured document representing the instance of the first object and the instance of the second object, respectively;
means for adding content of the first and second structured documents respectively representing the first and second objects into the database;
means for providing access to the database of objects such that application programs implemented in the first and second programming languages are capable of sharing objects, in their respective programming language, represented as structured documents in the database; and
wherein the database comprises a structured document, and wherein adding the content of each structured document representing one object comprises inserting the content of the structured document representing the object into the structured document implementing the database.

14. The system of claim 13, further comprising:
means for receiving multiple structured documents representing instances of objects defined for a class, wherein the objects represented in at least two different received structured documents were generated in different programming languages.

15. The system of claim 13, wherein the database structured document and the first and second structured documents representing the objects are in a same file format.

16. The system of claim 15, wherein the same file format comprises an extensible markup language (XML) document format.

17. The system of claim 13, wherein each of the first and second structured documents comprises an extensible markup language (XML) document.

18. The system of claim 13, wherein the first and second objects are instantiated from a same class.

19. A system for accessing a database of objects by a plurality of applications, comprising:

means for generating an instance of a first object and a second object, the first object including attributes and attribute values defined for a class, in a first programming language and the second object including attributes and attribute values defined for the class in a second programming language;
means for generating a first and second structured document representing the first and second objects respectively;
means for transferring each structured document to the database to maintain;
means for providing access to the database of objects such that application programs implemented in the first and second programming languages are capable of sharing objects, in their respective programming language, represented as structured documents in the database;
means for inserting content of the first and second structured documents into the database; and
wherein the database comprises a structured document.

20. The system of claim 19, further comprising:
means for receiving the first structured document from the database representing attributes and attribute values for the first object; and
means for generating a third object including the attributes and attribute values represented in the first structured document, wherein the generated object embodies the first object represented by the received first structured document, and the generated object is implemented in the first, second, or third programming language.

21. The system of claim 20, wherein the database structured document and the first and second structured documents representing the objects are in a same file format.

22. The system of claim 21, wherein the same file format comprises an extensible markup language (XML) document format.

23. The system of claim 19, wherein the structured document comprises an extensible markup language (XML) document.

24. The system of claim 19, wherein the first and second objects are instantiated from a same class.

25. An article of manufacture for maintaining a database of objects wherein the article of manufacture comprises code implemented in a computer readable medium capable of causing a processor to perform:
receiving an instance of a first object and an instance a second object to store in a database, wherein the first object is implemented in a first programming language and the second object is implemented in a second programming language;
generating a first and second structured documents, wherein the first structured document representing the instance of the first object and the second structured representing the instance of the second object;
adding content of the first and second structured document respectively representing the first and second object into the database;
providing access to the database of objects such that application programs implemented in the first and second programming languages are capable of sharing objects, in their respective programming language, represented as structured documents in the database; and
wherein the database comprises a structured document, and wherein adding the content of the first and second structured documents comprises inserting the content of the first and second structured document into the structured document implementing the database.

26. The article of manufacture of claim 25, wherein the code is further capable of causing the processor to perform:

receiving multiple structured documents representing instances of objects defined for a class, wherein the objects represented in at least two different received structured documents were generated in different programming languages.

27. The article of manufacture of claim 25, wherein the database structured document and the structured documents representing the objects are in a same file format.

28. The article of manufacture of claim 27, wherein the same file format comprises an extensible markup language (XML) document format.

29. The article of manufacture of claim 25, wherein the structured document comprises an extensible markup language (XML) document.

30. The article of manufacture of claim 25, wherein the first and second objects are instantiated from a same class.

31. An article of manufacture for accessing a database of objects by a plurality of applications, the plurality of applications written in at least two different programming languages, wherein the article of manufacture comprises code implemented in a computer readable medium capable of causing a processor to perform:

generating an instance of a first object including attributes and attribute values defined for a class in a first programming language;

generating an instance of a second object including attributes and attribute values defined for the class in a second programming language;

generating a first structured document representing the first object and second structured document representing the second object;

transferring each structured document to the database to maintain;

providing access to the database of objects such that application programs implemented in the first and second programming languages are capable of sharing objects, in their respective programming language, represented as structured documents in the database;

inserting content of the first and second structured documents into the database; and wherein the database comprises a structured document.

32. The article of manufacture of claim 31, wherein the code is further capable of causing the processor to perform:

receiving the first structured document from the database representing attributes and attribute values for the first object; and generating a third object including the attributes and attribute values represented in the first structured document, wherein the generated object embodies the first object represented by the received first structured document, and the generated object is implemented in the first, second, or a third programming language.

33. The article of manufacture of claim 32, wherein the database structured document and the first and second structured documents representing the objects are in a same file format.

34. The article of manufacture of claim 33, wherein the same file format comprises an extensible markup language (XML) document format.

35. The article of manufacture of claim 31, wherein each of the first and second the structured documents comprises an extensible markup language (XML) document.

36. The article of manufacture of claim 31, wherein the first and second objects are instantiated from a same class.

37. A computer readable medium including a computer database of objects, comprising:

a first and second structured documents, wherein the first structured document representing an instance of a first object including attributes and attribute values defined for a class in a first programming language and the second structured document representing an instance of a second object including attributes and attribute values defined for the class in a second programming language;

a database interface to receive a request to store the instance of the first and second objects to the database and to store content of the first and second structured documents into the database; and wherein the database interface further provides access to the database of objects such that application programs implemented in the first and second programming languages are capable of sharing objects, in their respective programming language, represented as structured documents in the database, wherein the database comprises a structured document, and wherein the first and second structured documents respectively representing the first and second objects are added to the database by inserting the content of the first and second structured documents into the structured document implementing the database.

38. The computer readable medium of claim 37, wherein the database stores multiple structured documents representing instances of objects defined for a class, and wherein the objects represented in at least two different structured documents stored in the database were generated in different programming languages.

39. The computer readable medium of claim 37, wherein the database structured document and the first and second structured documents are in a same file format.

40. The computer readable medium of claim 39, wherein the same file format comprises an extensible markup language (XML) document format.

41. The computer readable medium of claim 37, wherein the structured document comprises an extensible markup language (XML) document.

42. The computer readable medium of claim 37, wherein the first and second objects are instantiated from a same class.

* * * * *